United States Patent
Van Heeckeren et al.

[15] 3,697,149
[45] Oct. 10, 1972

[54] FOURIER TRANSFORM HOLOGRAPHIC STORAGE AND RETRIEVAL SYSTEM

[72] Inventors: Jacob Van Heeckeren, Stanford; David R. Rodal; Bob V. Markevitch, both of Palo Alto, all of Calif.

[73] Assignee: Ampex Corporation, Redwood City, Calif.

[22] Filed: Dec. 10, 1969

[21] Appl. No.: 883,738

[52] U.S. Cl. ..............................350/3.5, 350/162 SF
[51] Int. Cl. ............................................G02b 27/22
[58] Field of Search ..........................350/3.5, 162 SF

[56] References Cited

UNITED STATES PATENTS

| | | | |
|---|---|---|---|
| 3,370,268 | 2/1968 | Dobrin et al. | 350/162 SF |
| 3,488,106 | 1/1970 | Lohmann | 350/162 |
| 3,530,442 | 9/1970 | Collier et al. | 350/3.5 |

OTHER PUBLICATIONS

Vitols, 8 IBM Tech. Disc. Bulletin 1581–3 (4/1966)

Primary Examiner—David Schonberg
Assistant Examiner—Robert L. Sherman
Attorney—Robert G. Clay

[57] ABSTRACT

A storage and retrieval system wherein information is represented as a Fourier transform, which in turn is recorded on film by a holographic process to thereby preserve the phase as well as the amplitude of the Fourier transform. Coherent light is introduced to a reflective or a transmissive light modulator, which includes a bit array which is selectively energized to represent the information. The Fourier transform is taken of the whole (optical) array of bits with a lens, and is recorded on film as a hologram utilizing both an object and a reference beam obtained from the coherent light source. All bit transforms cover the same area of the hologram since the Fourier transform of each bit covers the exact same area of the recording. A series of holograms may be recorded along a pre-selected length and width of film in the form of a microfiche or on a continuous tape.

The reproduce portion of the system includes a beam of coherent light which impinges the hologram preferably at an angle equal to the angle with which the reference beam impinged the film during the record process. An image of the modulator array is produced which is visually manipulated, or which may be focused via a lens onto a vidicon picture tube, or other readout device, which provides a continuous electrical signal representative of the light pattern.

16 Claims, 17 Drawing Figures

FIG_1

FIG_2

FIG_3

FIG_4

FIG_5

INVENTORS
JACOB VAN HEECKEREN
DAVID R. RODAL
BOB V. MARKEVITCH

BY *Robert H. Clay*

ATTORNEY

FIG_6

FIG_7

FIG_8

INVENTORS
JACOB VAN HEECKEREN
DAVID R. RODAL
BOB V. MARKEVITCH
BY
Robert S. Clay
ATTORNEY

FIG_9

FIG_10

FIG_11

INVENTORS
JACOB VAN HEECKEREN
DAVID R. RODAL
BOB V. MARKEVITCH

BY Robert H. Clay
ATTORNEY

FIG_12

FIG_13

FIG_14

FIG_15

FIG_16

FIG_17

INVENTORS
JACOB VAN HEECKEREN
DAVID R. RODAL
BOB V. MARKEVITCH

BY Robert S. Clay
ATTORNEY

FOURIER TRANSFORM HOLOGRAPHIC STORAGE AND RETRIEVAL SYSTEM

BACKGROUND OF THE INVENTION

1. Field

The invention is related to high density digital or analog recording systems, and in particular to a recording and retrieval system utilizing a holographic process to record Fourier transforms.

2. Prior Art

Typical of a first type of prior art devices are high density recording processes which employ laser or electron beams to provide a recording of small information bits spaced closely together. This involves the recording of digital information by means of either "white" dots (or squares) on a "black" background; or the recording of "black" dots on a "white" background. In principle, the digital packing density can be exceedingly high with extremely fine-gained films; the systems can be reliable if the conclusions are based on the statistical noise that is caused by such things as film grain; and high output levels may be achieved if the entire dynamic range of the film is utilized. However, since each bit represents one portion of information small imperfections or minor damage to the recording, e.g., damage to the emulsion, particles of dust that may settle on the film, scratches that are generated by film handling, etc., tend to obliterate and destroy a large amount of information.

To alleviate such problems either redundant recording is used or, more generally, considerably larger areas are assigned to each bit, thereby decreasing the available packing density. If high packing density is used, the line or array of bits must be very carefully located to allow optimum readout of the proper bit at a given time; i.e., precise tracking must be provided in readout.

In the same type of scheme, another system of digital recording utilizes a laser to record bits by selective evaporation of a thin metallic coating disposed over a transparent substrate. Readout is based on the transmittance of the selectively cleared substrate. Since bit size is of the order of one micrometer, bit reliability is threatened by dust, scratches, and the debris from the evaporation process when recording. In addition, readout also requires accurate line tracking as noted above.

Typical of a second type of high density recording process, is that which utilizes area sharing of information wherein each bit is represented by a different oscillating frequency, each of which in turn is used to intensity modulate a beam of a cathode ray tube. The scanned line on the cathode ray tube is imaged onto photographic film so that a single line of selected width and length contains the plurality of bits of information. Such a scheme is a two-dimensional form of recording wherein the registration problem is still somewhat severe, and slight rotation of the recorded film causes severe cross-talk during playback since portions of adjacent recorded lines are readout together.

SUMMARY OF THE INVENTION

The present invention provides apparatus for recording and playing back holograms which contain a selective plurality of bits of information. A light modulator device capable of temporarily storing a representation of a plurality of bits is impinged by a light beam, preferably coherent. The laser is pulsed to illuminate the stored bits which, in turn, provides a phase variation pattern of the laser light pulse transmitted by the modulator. A transform lens is placed to intercept the resulting "object" beam and to convert the phase pattern into a Fourier transform. Simultaneously, a "reference" beam extracted from preferably the same laser light, is by-passed around the modulator and the transform lens, and is directed on to the recording medium along with the Fourier transform. The resulting transform hologram is recorded on the recording medium, viz, a photographic film. The reference beam, taken in conjunction with the object beam provides means for recording the phase as well as the amplitude of the light from the modulator. The recording is effected by means of a complex light interference pattern on the film generated by superimposing the object and reference beams.

More particularly, in a basic embodiment of the invention, the optical system for the holographic recorder employs beam splitter means for forming the object and the reference beams. A beam expanding lens, a beam collimating lens, and a transform lens or lenses are used in the object beam path. A plurality of mirrors are utilized to direct the reference beam from the beam splitter means to the film.

The readout system of the invention provides a laser beam similar to that used in the recording process, which illuminates the recorded transform hologram at substantially the same angle used for the recording reference beam. The (inverse) transform is produced via a lens disposed to intercept the beam passing through the hologram, at a position one focal length from the hologram on the film. The f-number of the lens is no greater than that required in the recording process. In the latter system, the bit array is thus reconstructed and introduced to a photosensitive device to provide an electrical output representative of the recorded bits.

The present invention includes not only means for recording and reproducing individual holograms utilizing a Fourier transform to represent the information, but further includes an overall storage and retrieval system utilizing microfiches as the storage media, wherein selected pluralities of holograms are recorded in a selected format on the microfiches.

DESCRIPTION OF THE PREFERRED EMBODIMENTS

Figure 1:
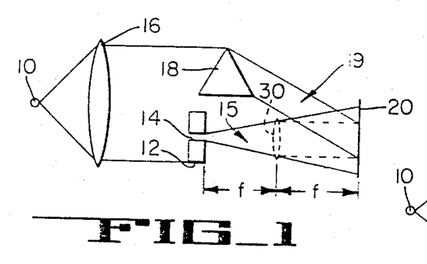
FIGS. 1 and 2 are schematic diagrams useful in explaining the underlying concept of holographic recording.
Figure 2:
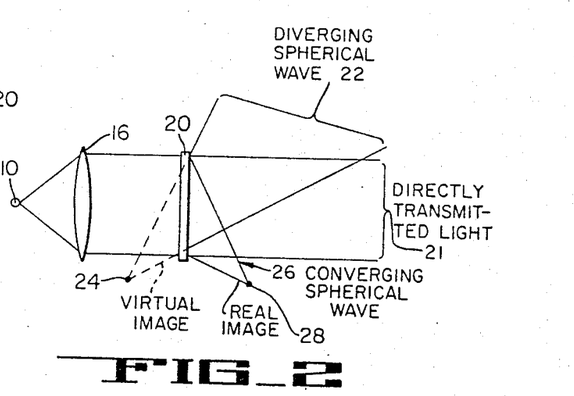

The present invention is concerned with the recording and readout of information in the form of Fourier transforms utilizing the holographic recording process. By way of explanation, the holographic process is best understood by considering a very simple object such as a single bright point of light. Referring to FIG. 1, a single coherent source of light 10, illuminates an opaque mask 12 containing a tiny pinhole 14, with a coherent "object" wave 15 utilizing a lens 16. Simultaneously, a portion of the light is diverted as by means of a prism 18, to provide a coherent "reference" wave 19. Thus a photographic plate 20 has the sum of two coherent waves incident thereon, one a reference plane wave, and the second a diverging spherical wave originating from the pinhole 14. The photographic plate 20 records the pattern of interference between these two waves. The intensity pattern recorded on the plate 20 is composed of light and dark fringes of a particular structure identical with that of a so-called "offset Fresnel-zone plate." If the transparency hologram recorded on the plate 20 is illuminated by a plane wave, three distinctly different waves are transmitted by the plate as shown in FIG. 2.

First, a portion 21 of the incident plane wave passes through the transparency uniformly attenuated, but otherwise unchanged. Two additional waves are generated by diffraction at the transparency. One such wave, indicated by numeral 22, is a diverging spherical wave, which appears to originate from a virtual point source to the left of the hologram on the plate 20. This wave 22 may be regarded as creating a virtual image of the original pinhole at point 24. A third transmitted wave component is a converging spherical wave indicated at 26, which comes to a focus unaided to the right of the hologram on plate 20. This bright, focused point of light at 28 may be regarded as the real image of the original object pinhole. Thus the holographic process generates "twin" images of the original pinhole 14; one a virtual image to the left of the transparency, i.e., plate 20, and a second real image to the right of the hologram on plate 20.

An object more complicated than a pinhole, for example a continuous tone transparency, may always be regarded as a complicated collection of pinholes, each with a different brightness. Thus each point on the object produces a unique extended fringe pattern on the hologram and likewise, the hologram produces twin images of each point on the object at either side thereof.

Figure 3:
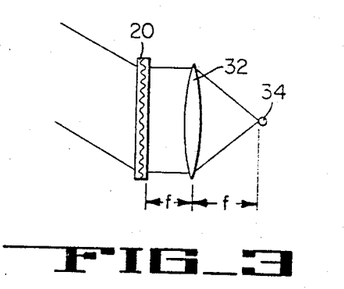
FIG. 3 is a schematic diagram useful in explaining the underlying theory of holographic readout.

A second type of recording geometry is shown in FIG. 1 utilizing the configuration therein, further modified as shown in phantom line. Accordingly, a transform lens 30 is included in the object beam emerging from the pinhole 14, wherein the lens 30 is disposed one focal length $f$ thereof from the mask 12 and also from the plate 20. This particular geometry yields what is known as a "Fourier transform hologram," so called because the light distribution recorded in the back focal plane of the lens 30 is the Fourier transform of the light distribution across the front focal plane. For this particular recording geometry each object point produces a simple sinusoidal fringe pattern rather than an offset Fresnel-zone plate. The advantage gained by this geometry is that the particular locations of the reconstructed images obtained in the back focal plane of a transform lens 32 (FIG. 3) during the readout process, are quite independent of the registration, i.e., the location of the hologram on the plate 20.

When a light signal is observed by a square law device such as, for example, the human eye, photomultipliers, photographic film, photodiodes etc., only the intensity of the light is observed. The phase of the light relative to a reference portion on the signal beam is not observed by such means. Therefore, the whole signal has not been observed. In the case of photographic film in particular, the whole signal inclusive of phase information cannot be recorded.

Holographic recording recently developed allows the recording of phase information as well as intensity on photographic film. Photographic film is capable of recording only intensity; in order to record phase, a desired (object) signal containing phase is added to a reference signal so that the signal finally recorded on the film is the sum of the reference and object signals. The film now reads some power of the product of the sum signal and its complex conjugate, and therefore, mathematically records not only the intensities of both the signal light beam and the reference light beam, but also of the cross products. These cross products contain the complete signal with its phase information preserved. Since an accurate relative phase reference is required in the recording and playback processes of holography, it is preferable to utilize a coherent light source such as a laser, and adequate geometric stability.

Regarding now the Fourier transformation concept utilized in the present invention, the Fourier transformation allows uniquely describing a given function of one coordinate set by a function of another coordinate set. Upon a second Fourier transformation, the original function including its phase information, is uniquely recovered. In optical information processing, a lens may be utilized to perform such Fourier transformations.

The Fourier transformation has, inter alia, various convenient properties; (1) a point source of light transforms into a uniform illumination of infinite width; (2) the transform of a displaced function is the same as the transform of the undisplaced function, except that it is multiplied by a linear phase term. The first property shows that through Fourier transformation a very small bit, such as used in digital recording, may be recorded over a relatively large area. This in itself may seem to conflict with high density recording but it does provide extremely good reliability and record protection. The second property, on the other hand, shows that many bits may be recorded on an identical area. Accordingly, the ultimate bit density may be made extremely high while maintaining the same immunity to damage as has the single bit alone when its transform is spread over the whole area.

As previously mentioned, a Fourier transform is produced by a simple lens. Parallel light incident on a lens focuses to a spot in the focal plane of the lens, and vice versa. Thus, the Fourier transform of a signal present in one focal plane of a lens is located at the other focal plane of the lens. In order to record a Fourier transform, it is necessary to record a complex function, which implies preservation of both amplitude and phase as previously discussed with reference to FIGS. 1 and 2. Since the holographic technique records both amplitude and phase, it lends itself to the recording of a Fourier transformation of a signal.

In order to achieve a certain tolerance for partial destruction of a recording, it is necessary to provide for some form of redundancy. In the conventional digital recording method, this is generally achieved either by recording large bits, or by recording small bits a number of times. The size of the bits and their closeness define the packing density. In the Fourier transform, as utilized in the invention, redundancy is achieved by selecting the size of the Fourier transform of a single bit in the recording. The number of bit transforms superimposed on this same area now defines the packing density.

Within the transform envelope, the transform phase of all bits interferes in the recording plane, so as to produce a pattern which cancels in more and more locations, as the space between the bits and information array decreases. The farther the information bits are separated, the less cancellation is produced in the transform. Therefore, to obtain good redundancy, it is generally preferable to compromise between the redundancy and the effective packing density of the information, by spacing the information bits relatively far apart. Accordingly, if the centers of the bits are spaced at two bit diameters, four times as many bits can be recorded on the same transform area, but the redundancy and therefore, damage tolerance is only a factor of four, rather than a factor of 16 as when the bits are spaced at four bit diameters.

Bit reliability, another desired property for digital recording, may be regarded as the quality of the reconstructed information after experiencing a certain degree of destruction of the recorded transform area. When a circular bit is used, the full Fourier transform to be recorded is a complete set of concentric rings, which are termed Airy discs. These rings extend to infinity with diminishing amplitude. Clearly, it is wasteful in packing density to record the entire infinite plane. Accordingly, a truncation is performed in the invention by recording only a limited portion of the transform. This is mathematically described by multiplication in the transform plane by an aperture function. In the playback plane, this is equivalent to convolution of the signal with a different set of Airy discs. The larger the recorded area of the transform, the narrower are the resulting Airy discs. The Airy discs upon convolution tend to reduce the sharp definition of the edges of the bits, making it appear as though the bits had widened. The resolution of the reconstruction has therefore been somewhat reduced. As herein practiced, by recording only the central bright portion of the transform, the bits will be "widened" approximately by a factor of 2 upon reconstruction. This is, of course, in the convolution sense where edge definition has been reduced to a more gradual change.

If only the central portion of the transform is recorded, with an initial bit spacing ratio of 2, the bits will "touch" in the reconstruction. With a bit spacing ratio of 4, the bit spacing ratio of the reconstructed array will still be equal to 2. Due to the sharp drop-off of Airy disc convolution close to its center, degeneration by a factor of 1½ is actually more reasonable.

Accordingly, in keeping with the invention, the Fourier transform holographic recording method provides an extremely reliable means of high density (digital) recording. The method, although sophisticated, is relatively simple to implement. Catastrophic failure of the recording occurs only if a good deal more than half of the recording is completely destroyed. Accordingly, more than one-half of 1 millimeter square area in the particular application herein described, containing information on, for example, 3,600 bits, must be destroyed in order to lose the information. This type of reliability is extremely valuable in all forms of high density recording, and is hardly practical in systems other than those employing holographic recording as employed in the invention concept.

One of the properties of Fourier transformation as previously mentioned, is that mathematically an infinite series of equally spaced delta functions transforms into another infinite series of equally spaced delta functions. Truncation of the transform series is provided by allowing a finite width to the initial delta functions. If the initial delta functions have a finite width, then the width of the Delta Functions produces a multiplicative envelope over the Fourier transform, which "truncates" the transform. As a result an initial array with bit spacing ratio of 4 will produce a Fourier transform with about 9 bright spots across the diameter of the central portion. Between these spots are areas of very low intensity. In a bit spacing ratio of 4, the distance between bit centers is four times the bit diameter. In order to spread out the energy contained in these few bright spots over the entire area (i.e., to reduce the film dynamic range), it is preferable in the practical device to utilize a random array rather than a regular array structure in the initial function. A regular array is one wherein the bits are symmetrically repetitive (e.g., a rectangular array has $x-y$ uniform bit spacings, or in a circular array has radially symmetrical bit spacings). The converse is true in nonregular arrays.

To this end, the most complete distribution of energy can be obtained by use of the purely random array, which gives a virtually uniform distribution within the Airy disc envelope. A more reasonable approach however, is to require each bit to lie randomly within its own permissible area. In turn, all the areas for the individual bits are regularly arranged. This also produces a virtually uniform distribution of energy in the transform within the Airy disc envelope.

Another method which is acceptable, but which fails to provide as good a distribution of energy in the recording plane, is to divide the array into blocks. The blocks themselves are completely regular and their centers are regularly located. When the center-to-center spacing of these blocks is a particular non-integer multiple of the bit spacing, there is a cancellation in the Fourier transform, so that the bright spots are just exactly at the location of a zero of a multiplicative envelope. Also new contribution centers are introduced in the spaces which originally had virtually no contribution. The result is a Fourier transform which is not as uniform as in the case of a purely random array, but which is considerably more uniform than in the case having a regular array. The resulting transform is well-suited for recording in accordance with the invention.

A further improvement may be had by dividing the array into segments, such that each segment is a block as described above, and such that the segments are centered at a particular non-integer multiple of the bit spacing.

A logarithmically spaced array or a spirally spaced array has been found to provide optimum results in generating a virtually uniform distribution.

Accordingly, to this end in a rectangular array in which the spacing between adjacent bits changes by a factor of two, from one side of the array to the other and in which the bit spacing changes evenly by, for example, logarithmic rule, the Fourier transform will be a very even distribution, except for a bounded region about the principal axis of a width corresponding to the transform of the widest bit spacing. This array will give the appearance of a regular array to the casual observer.

Further improvement may be had by eliminating angular regularity by using a spiral pattern, where, for example, the bit spacing varies logarithmically in the radial direction by a factor of two. Now the Fourier transform is very uniform, except for a central circular area, corresponding to the largest radial bit spacing. This is an almost perfect condition since the dark central disc contains the undesired, scattered and over-modulated zero order, and this does not obliterate any usable signal.

There are various basic apparatus for implementing the Fourier transform holographic recording and readout method in accordance with the invention. Furthermore, there are many modifications to the optical apparatus utilized, which may be made within the spirit of the invention. Accordingly, the various FIGS. 4–10 describe several embodiments of the invention apparatus in various stages of sophistication.

Figure 4:
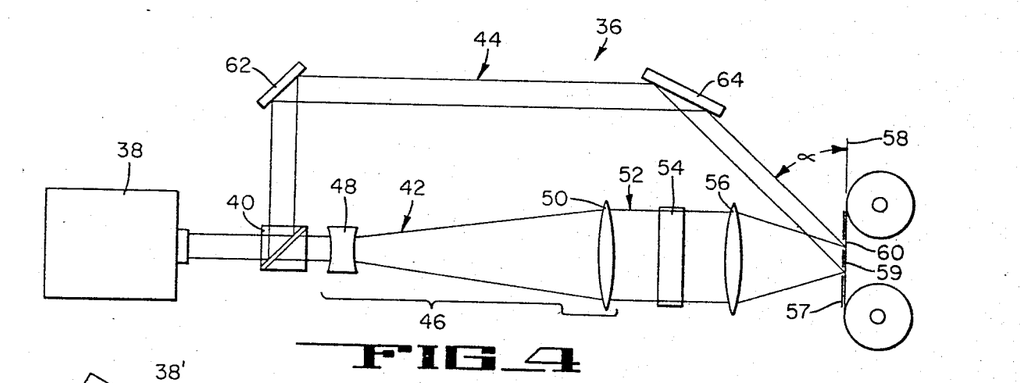
FIG. 4 is a schematic diagram showing a simplified recording embodiment of the present invention using a light transmissive type modulator.

Accordingly, referring to FIG. 4, there is shown a basic embodiment 36 of the invention. A source of coherent light such as a laser 38 generates a coherent, preferably single frequency, light beam which is introduced to a beam splitter 40. The beam is split into two beams; an object beam indicated by numeral 42, and a reference beam indicated by numeral 44. The splitter 40 provides about 5 percent of the beam as the reference beam 44, and about 95 percent as the object beam 42. Of the 95 percent of the object beam 42 most is attenuated so that the reference beam is stronger than the final object beam. The object beam 42 is passed through means for expanding the cross-section of the beam, which in the embodiment 36 is shown as a conventional Galileo type "expander" telescope 46. The telescope 46 is formed of an expanding lens 48 and a collimating lens 50. Lens 48 is a negative lens which prevents ionization of the air by the extreme intensity of a pulses ruby laser beam when focused by a short focal length positive lens. The lens 50 is utilized to provide a collimated light beam 52 as an input to the object or array, viz, light modulator 54, disposed in the path thereof. The modulator 54 is transparent to the impinging beam and is therefore considered a "transmissive object" modulator, whereby the embodiment 36 is herein identified as a Fourier transform hologram recorder utilizing a transmissive modulator.

The beam from the modulator 54 is impinged upon a transform lens 56 which focuses the beam to define the Fourier transform, i.e., the hologram at the transform plane 58. A record aperture 57 is disposed along the film plane and determines the size of a hologram 59 by masking the light from the two beams. A light sensitive recording medium 60, such as a silver halide film in the form of a card, or the flexible tape of FIG. 4, is disposed in the transform plane 58, whereby a recording of the hologram 59 is made upon exposure of the medium 60 by the laser 38.

The reference beam 44 extracted by the beam splitter 40 is reflected from a first mirror 62 to a second mirror 64, whereupon it is directed to the transform plane 58 in the area of the hologram 59, at a selected angle $\alpha$. The reference beam 44 in combination with the object beam 42 accordingly provide means for also preserving the phase of the Fourier transform, which is provided by the object beam 42.

Accordingly, as may be seen from FIG. 4, the optical system for a holographic recorder consists of a beam splitter means, beam expanding means, beam collimating means, and transform lens means. As shown infra, collimating and transforming may be accomplished by a single lens means. The various lenses employed in the system are generally "positive" or "converging" convex lenses, with the exception, for example, of the "-negative" lens 48, etc. In addition, reflector means such as mirrors are utilized to redirect the reference beam. The information to be recorded by Fourier transform is introduced to the object beam by means of the modulator means, which may be either a light transmissive type as shown in FIG. 4, or a light reflective type such as described hereinafter. In order to minimize vibration of the various components to stabilize the beams as required for recording the interference of multiple beams of coherent light, the optical components are usually rigidly mounted on a metal plate or optical bench in the practical apparatus. Since such form of mounting is generally known in the art, the apparatus described herein does not include the physical mounting structures.

Note that it is desirable to expand the beam 42 (and also the reference beam 44 as illustrated hereinafter) so that only the central portion thereof is used. Thus, greater efficiency is achieved because a laser produces a beam with a Gaussian intensity distribution, resulting in non/uniformity of the reference beam and non/uniform modulator (54) illumination. The central portions of the beams of all the embodiments accordingly contain most of the energy and are considerably more uniform.

Figure 5:
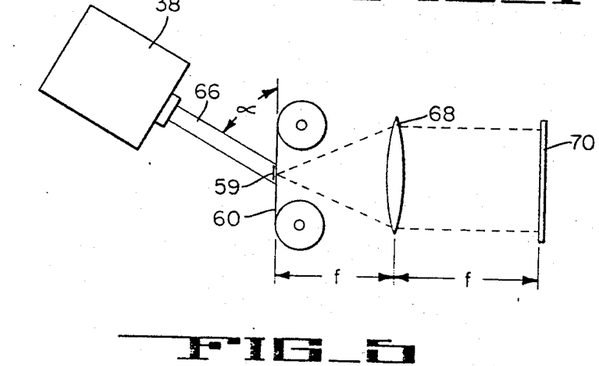
FIG. 5 is a schematic diagram showing a simplified readout embodiment of the present invention.

Referring now to FIG. 5, there is shown in simplified schematic a system for hologram reconstruction. To this end, the digital information present on the hologram 59 of recording medium 60, is illuminated with a reproduce beam 66 of coherent light from a laser 38' which may (but need not) be similar to laser 38 of the recording process of FIG. 4. The impinging beam axis is disposed at angle α to coincide with the axis of the (recording) reference beam 44 (FIG. 4) relative to the plane of the medium for improved efficiency. The reproduce beam 66 incident on the front surface of the hologram 59 will produce an image of the digital array as originally recorded. A lens 68 is disposed one focal length from the hologram 59, and provides focusing of the digital array light pattern on an image plane 70. The $f$-number of the lens 68 is preferably no greater than that of the lens (56) required in the recording process (FIG. 4).

By way of example only, a ratio of a desired bit spacing (i.e., the distance between the centers of adjacent bits) to bit diameter equal to 4, is approaching the optimum. Further, a 60 × 60 bit information array is also desirable, wherein only the central portion of the transform of the array, within 1 millimeter, is recorded. Thus, the side of the square array will therefore be 240 bit diameters long. The lens 56 aperture (FIG. 4) accordingly must be at least as large as the diagonal of the object or array, i.e., modulator 54. The recording process for the above example will thus require a transforming lens, e.g., 56, having a numerical $f$-number no greater than 1.2. It follows that a packing density of 3,600 bits per square millimeter in a square modulator 54, with an area redundancy factor of 16, requires a lens 56 with a maximum $f$-number of 1.2.

Due to the large size, e.g., 3 inch by 3 inch for a preferred practical size modulator (e.g., 54) such as required for a 3,600 bit array, considerable difficulty is encountered in locating a lens with a correct focal length, and aberration free aperture. For such a typical modulator size, the lens requirements are a 6 inch focal length and 4.25 inch aperture, or about $f$ 1.2. Lenses with such apertures are common for a 2 inch focal length but are generally unavailable in a 6 inch focal length, except on special order. To preclude the need for the special lens, or for having to redesign and compact the array, a telescope type optical system may be included in the apparatus to focus the object beam on the medium.

Figures 6, 7:
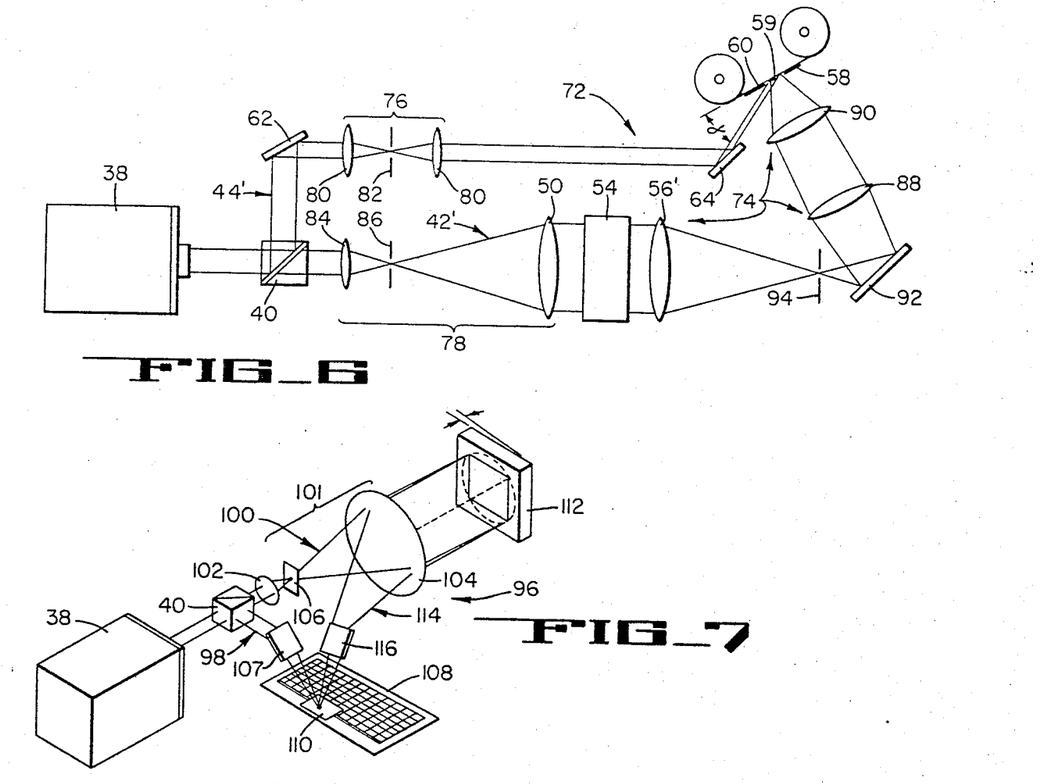
FIG. 6 is a schematic diagram of an alternative embodiment of the recorder shown in FIG. 4.
FIGS. 7, 8 and 9 are perspectives of other recording embodiments of the present invention employing light reflective type modulators.

Accordingly, FIG. 6 shows an alternative embodiment of the invention with various modifications made thereto and including as a specific example, a three-lens transforming system 74 in accordance with the invention. The embodiment is further modified by including spatial filter means 76 and 78 respectively, which filter the noise carrying portion of the laser light to thereby produce a beam of uniform intensity. The spatial filter means 76 includes a pair of lenses 80 and a pinhole or aperture 82 disposed therebetween at the coincident focal point of the lenses. Likewise, the spatial filter means 78 includes a lens 84 and an aperture 86, wherein the means 78 also includes the collimating lens 50 of FIG. 4 as a part thereof. With the exception of the three-lens transforming system 74, the remaining components in the system of FIG. 6 are identical to those of FIG. 4, wherein however, in the embodiment of FIG. 6 the mirror 64 is turned to direct the light away from the path of the object beam 42', to adapt the optics to the location of the three-lens transforming system 74, which in this instance is folded by mirror 92, and recording medium 60.

Regarding now the three-lens transforming system 74 of previous mention, the beam upon passing through the modulator 54 would present the Fourier transform 59 of the data in the focal plane, i.e., transform plane 58, of the lens 56 (FIG. 4) except for a spherical phase factor. The transform 59 at this location is, however, too large to provide a practical recording, and accordingly, preferably should be reduced in size. Also the spherical phase must be removed. Accordingly, the object beam 42' is passed from the modulator 54 through a first lens 56' similar to the lens 56 of FIG. 4 but of longer focal length, and thence to two more transform lenses 88 and 90. When properly adjusted, the true Fourier transform will lie beyond the last lens 90 at the record aperture 58, wherein the middle lens 88 removes the spherical phase. In order to properly orient and reduce the overall length of the beams a reflecting mirror 92 is employed to fold the object beam 42' back in the direction of the reference beam 44' and towards the recording medium 60. A truncating aperture 94 may be placed at the first amplitude transform plane of the object beam exiting from the lens 56'. If a reference beam truncating aperture is also focused on the recording medium 60, then the record aperture 58 may be omitted. Note that the beam reflected by mirror 92 is diverging, is converging after lens 88 and is finally focused via lens 90.

The three-lens transforming system 74 of FIG. 6 is employed because the transforming lens (e.g. lens 56') should have a numerical aperture of $f$ 1.2 to achieve the required packing density. A high quality $f$ 1.2 lens with the large aperture needed to cover the face of the modulator 54 is not readily available and is generally expensive to have made. Therefore, the large diameter lens 56' in the system of FIG. 6 may have a relatively high $f$-number, for example, 5.6. Another 5.6 lens, e.g., lens 88, is used to complete reduction of the transform. The actual transform is then formed by a small diameter lens 90 which has the desired $f$-number of 1.2 to provide the hologram of desired size commensurate with optimum packing densities.

Figure 8:
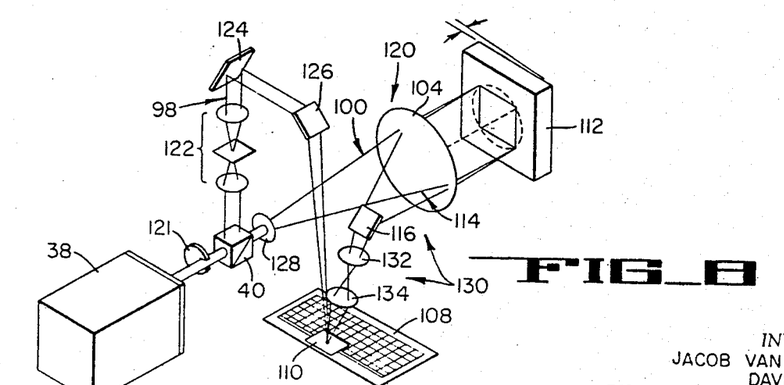
Figure 9:
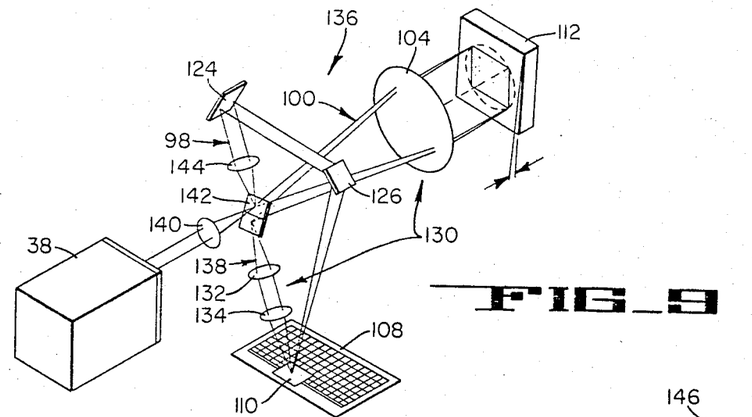

As previously mentioned, the embodiments 36, 72 of FIGS. 4 and 6 respectively show Fourier transform holographic recorders in accordance with the invention, utilizing a transmission object type of modulator 54. However, the invention is also readily implemented by apparatus utilizing a reflection object type of modulator, as is shown in the embodiments of FIGS. 7–9 described below.

In FIG. 7 there is shown a Fourier transform holographic recorder 96 employing a coherent light source such as laser 38. The initial beam therefrom is introduced to a beam splitter 40 which separates the beam into a reference beam 98 of approximately 5 percent of the light and an object beam 100 which has approximately 95 percent of the light but which as before will be attenuated so that the reference beam will contain more light than the object beam. The object beam 100 is passed through a microscope type lens arrangement 101 formed of lenses 102 and 104. A pinhole spatial aperture 106 is disposed in the focal plane of the lenses and the irregularities of the object beam 100 are removed. The reference beam 98 may also include such a microscope type converging lens arrangement, however FIG. 7 does not include same. The object beam 100 is expanded to twice the diameter so that only the central portion thereof is used, and is recollimated by the second converging lens 104.

The reference beam 98 is directed via a mirror 107 towards a recording medium 108 and a record aperture 110 disposed adjacent thereto. The recollimated object beam 100 from the collimating lens 104 is impinged upon the face of a reflection object modulator 112, and is reflected back through the lens 104. Since the modulator 112 is slightly tilted relative to the axis of the object beam 100, the axis of the reflected light beam 114 does not follow the axis of the incoming beam 100 and may be intercepted by a mirror 116. This directs beam 114 away from the axis of the object beam 100 and towards the record aperture 110 and recording medium 108.

As in the embodiment 36 of FIG. 4, the Fourier transform of the data presented to the object beam 100 via the modulator 112 is present in the focal plane of the lens 104, except for the previously mentioned property of spherical phase factor. The transform at the focal plane, e.g., at the recording medium 108, is recordable as is. However, for practical purposes and for practical recording densities the transform is too large and is preferably reduced in size, utilizing the three-lens transforming modification employed in FIG. 6. The spherical phase is also likewise removed.

To this end, referring to FIG. 8, there is shown a further sophisticated embodiment 120 of the present invention. The laser 38 directs an initial beam of coherent light to the beam splitter 40, which in turn provides about 5% of the light to define the reference beam 98 and about 95% of the light as the object beam 100 which will be attenuated as before, such as in the embodiment of FIG. 7. A rotary-disc shutter 121 may be provided to control the light beam exposure. In FIG. 8 a spatial filter means 122 similar to that of FIG. 6 is disposed in the reference beam 98. The spatial filter means 101 of FIG. 7 is omitted from the object beam 100 of FIG. 8 by way of example only. The reference beam 98 is expanded to twice the required diameter in the device of FIG. 8 as was the object beam 100 in the device of FIGS. 4 and 7, for the same reasons. The recollimated reference beam 98 is directed via two reflecting mirrors 124, 126 back towards the recording medium 108 and the record aperture 110, similar to those of FIG. 7. Note the mirrors 124, 126 are arranged to provide a reference beam path which is equal to the object beam path length, thereby providing optimum beam coherency. The object beam passed by the beam splitter 40 is directed towards a negative expanding lens 128 similar to lens 48 of FIG. 4, to provide the diverging object beam 100 which impinges the collimating lens 104. The collimated beam 100 continues towards the reflection object type modulator 112, which is at a slight angle with respect to the object beam. Thus, the reflected object beam depicted by numeral 114 is separated from the incoming beam 100 and is intercepted by the reflecting mirror 116. The reflected object beam 114 is directed towards the recording medium 108 and in particular the recording aperture 110. As in the case of the transmission object embodiment of FIG. 6, a three-lens transforming system herein depicted by numeral 130 is provided to improve the recording properties of the embodiment 120. Thus the three-lens transforming system 130 includes the collimating lens 104 which acts as a first transform lens for the reflected beam 114, and the transform lenses 132, 134 which provide for cancellation of the spherical phase and for focusing of the transform, respectively.

FIG. 9 shows a further embodiment 136 of the reflection object type of recorder, wherein however the modulator 112 is disposed at substantially right angles to the impinging object beam 100 and a special beam splitter is utilized, in combination with a slightly off-axis configuration, to separate the reference beam 98 from the reflected object beam herein indicated as 138, and the object beams 100 and 138. Accordingly, the laser 38 delivers a coherent beam of light to a beam enlarging lens 140, which in turn directs the beam to a semi mirrored beam splitter, 142. The beam splitter 142 performs the usual function of separating the reference beam 98 from the object beam 100, whereby the reference beam is collimated by the lens 144 and is redirected by means of mirrors 124, 126 towards the recording medium 108 and particularly the record aperture 110. As usual, the larger amount of light (which is subsequently heavily attenuated) is passed as the object beam 100 into the collimating lens 104, and from thence into the reflection object type modulator 112, which is disposed at a slight angle with respect to the incoming object beam axis. The reflected object beam indicated as beam 138 is redirected back very slightly off-axis of the incoming beam 100 and impinges the fully reflecting surface of the semi-mirrored beam splitter 142.

Beam 138 is passed through the two transform lenses of a three-lens transforming system 130 similar to that of FIG. 8 employing the lenses 104, 132, and 134. The resulting Fourier transform is focused on the recording medium 108 via the record aperture 110.

Figure 10:
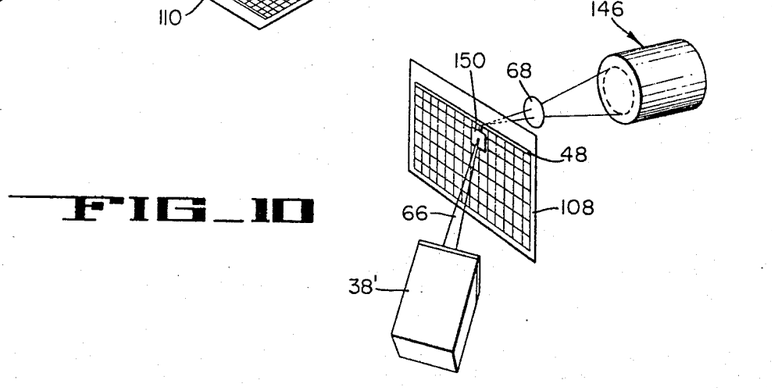
FIG. 10 is a perspective of another readout embodiment of the invention.

Referring now to FIG. 10, there is shown a more detailed version of the reproduce system of the invention shown in FIG. 5. The initial figure suggests the use of a display for playback wherein the primary manner of evaluation of the hologram reconstruction is visual. However, in FIG. 10 a more sophisticated method of readout is to convert the reconstructed image into electrical form utilizing a vidicon tube (television camera), indicated by numeral 146. Thus laser 38' impinges a coherent beam of light 66 on a recording medium 108 (e.g., a microfiche) having recorded thereon a series of holograms 148. The beam is passed through a reproduce aperture 150 at substantially the same angle α as used by the recording reference beam during the record process, and impinges a single hologram. The Fourier transform of the hologram information is reconstructed at the face of the vidicon tube 146 by means of the transform lens 68, which images the bit array pattern emerging from the medium 108. By way of example only, the lens 68 may be a 55 millimeter focal length, Nikor f 1.2. The output signal of the vidicon tube 146 consists of a serial stream of digital data corresponding to the data recorded in the Fourier transform. The electrical readout from the vidicon tube may be presented, for example, in two forms: (1) The presentation of a television type picture showing the bits in the reconstruction; (2) The presentation of the sweep across a single line of bits in the "A-scope" manner. In the later presentation a vidicon tube 146 scans one line of the reconstructed image, an oscilloscope (not shown) also scans one line. If the bit is present then the beam is deflected vertically and displays the digital signals that would be available for transmission to the computer (not shown).

The vidicon camera depicted by tube 146 may be a Toshiba vidicon camera used to convert the image of the digital array extracted from the recording medium back into the original electronic form. The technique of the light display into an electrical signal is identical to that used in video image conversion systems, except that a coarser line raster across the face of the tube can be used.

The camera is somewhat modified in order to adapt it to the playback system. Internal to the camera are the vidicon tube 146, video amplifier and focus supply (not shown). In order to vary the sweep rate, an external yoke driver, a sawtooth generator and a power supply are added. The digital output of the system is in the form of a sequence of pulses of selected amplitude. The pulses which represent the digital information together with some background noise, vary in frequency since the spacing of the bits in the digital array is not constant as further described infra.

The digital signal may be displayed on a pair of oscilloscopes. One scope displays a magnified image of the bit array similar to a television monitoring system. This is accomplished by intensity modulating the electron beam of the oscilloscope while synchronizing the horizontal and vertical sweeps with those of the camera sweep system. The second oscilloscope displays a section of a single row of bits in the form of a train of square pulses. A positive going pulse indicates the presence of a bit along a particular row.

In another readout system, the reconstructed bit array at a plane along the face of the tube 146 is sampled by a photosensitive device. By appropriate sampling a group of bits provide a corresponding group of parallel outputs, which are then applied to the bit positions of a register (not shown). The parallel input is converted to a bit stream. Other groups of bits "set" other registers and the total output bit stream is a reproduction of the originally recorded input bit stream.

Regarding the various components of the sophisticated embodiment of FIG. 8 by way of example only, the laser 38 may be a Spectra-phyics Model 124 laser. This is a continuous wave helium-neon laser which exhibits high reliability and long lifetime. The output of the laser is 20 milliwatts of red light (632.8 nanometers). Since this laser has a high degree of coherence, it would be unnecessary to equalize the optical path lengths of the reference and object beams such as is noted in the description of FIG. 8, e.g., the unequal lengths of light paths of FIG. 7 may be utilized. The expanding lens (lens 128) may be a Spectra-phyics spatial filter Model 332 which produces a rapidly divergent beam and serves to eliminate unevenness in the light intensity across the object beam, due to minute laser and lens imperfections.

The recording medium, (e.g. 60 or 108) is a light sensitive film in the form of a strip integrally formed as part of a film card, e.g., a microfiche (FIGS. 7–10), or may be a continuous film or light sensitive tape such as shown, for example, in FIGS. 4 and 6. The plane of the film is normal to the axis of the object beam from the transform lens (e.g. lens 134 of FIG. 8). There is no back plate in contact with the film. This facilitates projecting an image of the modulator with an imaging lens and screen for monitoring purposes or even for use of the transport for playback. The apparatus of the invention exhibits no measurable degradation due to any possible vibration. Likewise, only minimal shielding is necessary to protect the film from stray light, whereby recordings are made under limited yellow darkroom conditions. The recording medium 108 of FIG. 8 may be, for example, Eastman Kodak 35 mm 649F type high resolution film. By way of example, the recording medium 108 (microfiche) including the film strip, is placed into guides in a transport which translates in both the $x$ and $y$ directions with respect to the impinging object beam which passes along the $z$ axis. Thus in a strip of film about 6½ inches long, 800 recordings are placed in eight rows of 100 recordings each, which are spaced on 1 millimeter centers.

On the other hand, the film may be utilized in the form of a continuous tape (FIGS. 4 and 6) wherein the medium is stepped along its length and transverse rows are recorded across the tape width at each stop of the medium. Since film transport apparatus for both cards and/or tapes are well known in the art, a further description of the apparatus is not included herein.

The holographic technique of the invention requires that the modulated light be coherent with the reference beam. The coherence requirement narrows the choice of light modulating mechanisms to one which preserves the coherence of the incident light. To this end there are, for example, a transmissive or reflective type modulators, illuminated with collimated coherent light, as described with reference to the various FIGS. 4–10. Some of the possible modulation mechanisms are diffraction, absorption, scattering, electro-optic effect, magnetooptic effect, etc. The modulators of primary interest here employ the mechanisms of diffraction (sonic cells) scattering (liquid crystals, ceramics, etc) and electro-optic effect (solid crystals, ceramics) as depicted in FIGS. 4, 6, 7–9.

Typical of a sonic cell type of modulator for use in FIGS. 4 and 6, by way of example only, modulator 54 comprises a multi-channel array of Debye-Sears light modulators, wherein the bit pattern is created by sending streams of bits into each of the acoustic channels thereof. The streams of bits consist of bursts of a carrier frequency at which the acoustic transducers are resonant. The presence of a burst indicates a "one," the absence of a burst indicates a "zero" bit. Since the effective wave motion caused by the velocity of the acoustic beam in the water of a quartz crystal transducer has to be "stopped," a pulsed ruby laser with, for example, a peak power of 100 megawatts and a pulse duration of 10 nanoseconds is used. The modulator is operated at a carrier frequency of 10 megahertz and holograms of 6 × 6 bit arrays (i.e., 36 bits per array) are generated and reconstructed with excellent results. Since the description and function of sonic cells generally are known in the art, a further detailed description is not included herein.

The reflective object type of modulator, depicted in FIGS. 7–9, utilize the scattering mechanism and are defined generally as liquid crystal modulators. These modulators utilize the principles of applying the D.C. potential across the liquid therein which causes the liquid to become a light scatterer by turning "milky" (or translucent) rather than remaining transparent. Individual reflective means are provided within the modulator surface, each associated with a bit to be recorded via the holographic recorder system, whereby the array of reflective surfaces are selectively energized to provide the Fourier transform of the data to be recorded via the holographic process. The reflective modulator, e.g., 112 of FIGS. 7–9, could be, for example, of the type described in copending U.S. application Ser. No. 869,221 entitled LIQUID CRYSTAL LIGHT VALVE to J. van Heeckeren, filed Oct. 24, 1969, and assigned to the assignee of the subject application.

Figure 11:
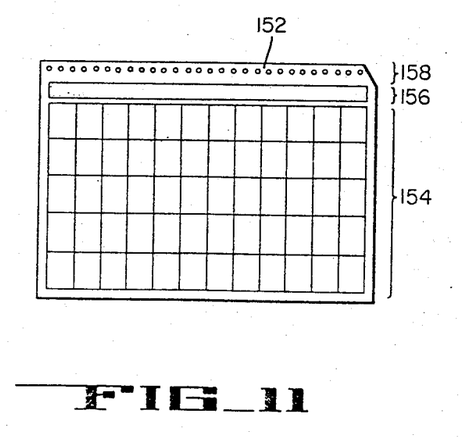
FIG. 11 is a plan of a microfiche card utilized in the system of FIG. 12.

FIG. 11 shows a plan of a microfiche 152 which may be utilized in accordance with the various embodiments hereinbefore described, to provide a storage system for selectively recording and retrieving information. The microfiche 152 is particularly adapted for use in a human-readable/machine-readable (HRMR) storage and retrieval system. Accordingly, the microfiche, by way of example only, may contain 60 pages of human-readable textual information in the area indicated herein by numeral 154, a block or strip of machine-readable information herein indicated by numeral 156, and a human-readable accession number and a single line of human-readable title as well as identification notches at the top edge thereof, herein generally indicated by numeral 158. To date, the recording of the machine-readable information along with the conventional human readable information, has not been feasible, and accordingly, the invention provides a HRMR device heretofore unavailable.

Figure 12:
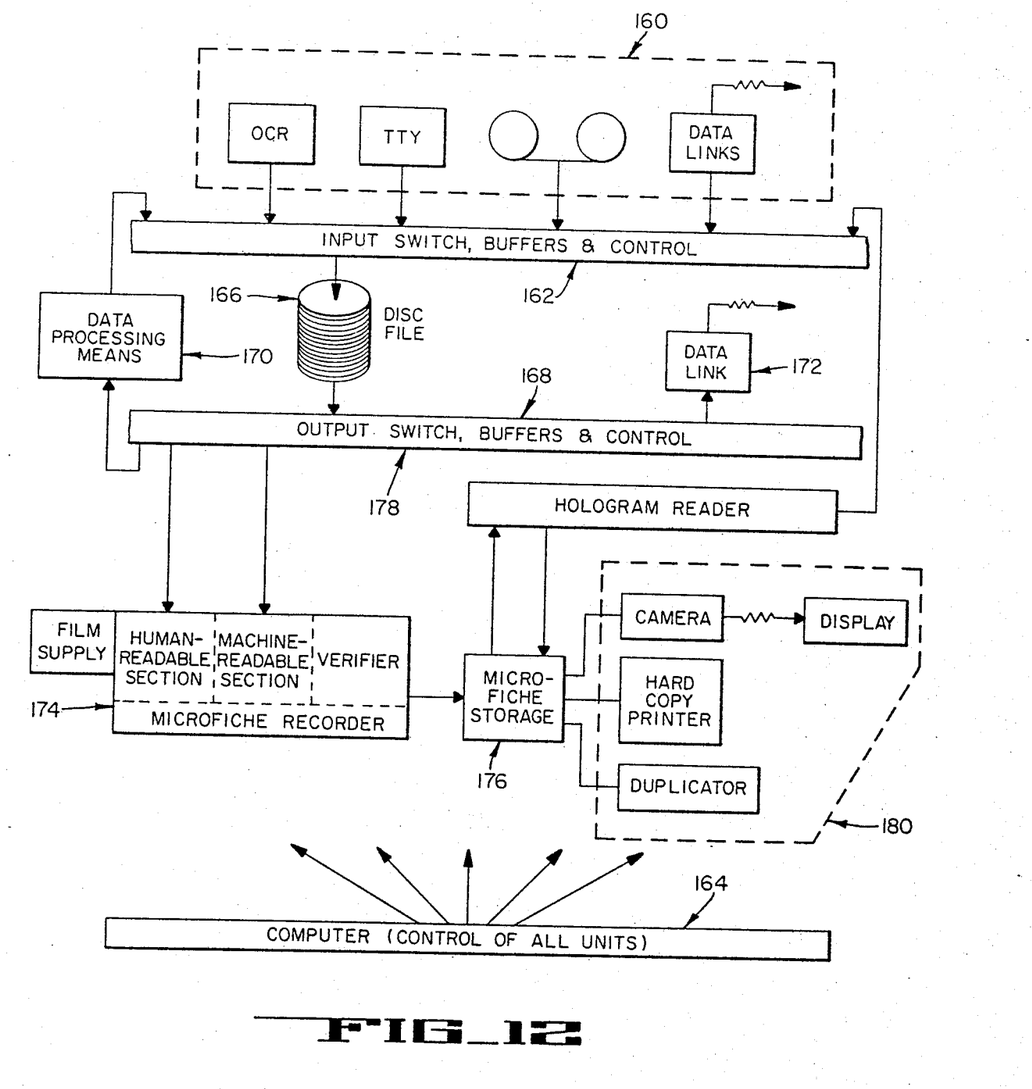
FIG. 12 is a block diagram of an overall human-readable/machine-readable (HRMR) storage and retrieval system incorporating the concepts of the invention.

Accordingly, in referring to FIG. 12 in conjunction with FIG. 11, an overall HRMR storage and retrieval system employing the invention concepts, includes a new information input 160 which might include for example an optical character reader (OCR), teletype units (TTY), tape recorders, radio data links, etc. Input means 162 performs information switching functions and may in fact be considered to be part of a main computer 164 depicted at the bottom of the figure. A disc file 166 is coupled to the input means 162 to perform intermediate storage of the information. Output means 168 is coupled to the disc file 166 output and generally defines portions of the main computer 164. The output means 168 provides means for branching the output from the disc file 166 to various other elements in the overall system. Data processing means 170 contains various other data processing equipment, such as, for example, an associative search module, (not shown) which operates between the output and the input means 168, 162 respectively. A radio data link output 172 may be provided from the output means for remote transmission of the disc file 166 information.

In accordance with the invention concepts a microfiche recorder 174 is coupled between the output means 168 and a microfiche storage unit 176, and from thence to a hologram reader 178. Visual and copying means 180 is coupled to the storage unit 176 for displaying the various microfiches and/or making copies or duplications thereof. As shown, the microfiche recorder 174 is divided into a film supply, a human-readable section or module, a machine-readable module and a verifier module.

Typical information flow between these units can best be described in an "update" mode. Assume that a microfiche A (152, FIG. 11) is to be updated and accordingly is selected from the microfiche storage unit 176 and is placed in the hologram reader 178. The reader then transfers the digital information through the input means 162 onto a selected section A of the disc file 166. The various input devices will also feed the information through the computer to other portions of the disc file 166. The computer then performs an editing and merging operation and forms newly edited information, which is placed into section A of the disc file 166 for subsequent recording onto a microfiche.

The printing of a new microfiche can then start. This mode begins with the transfer of film (either cut or continuous) from the film supply section of the microfiche recorder 174 into the human-readable recording section. The information then contained in the disc file section A flows through the output means 168 to the human-readable section of the microfiche recorder 174 and the human-readable portion of a new microfiche A is generated.

Simultaneous with this writing of the human-readable portion of the new microfiche A, a microfiche B is taken from the storage unit 176 into the hologram reader 178 and an update operation similar to that just described proceeds with the information now being accumulated within a selected section B of the disc file 166. At the completion of the generation of the human-readable portion of the microfiches A or B, there will be two complete sets of data in the disc file 166. Section A contains the data which has been written in human-readable form, and is now again used to write the digital portion of microfiche A. Section B of the disc file 166 contains the information that is used by the human-readable recording section of microfiche recorder 174 to generate the human-readable portion of microfiche B.

Another microfiche C can now be retrieved and placed in the hologram reader 178, and its information is put into a selected section C of the disc file 166, via the input means 162 in the same manner as previously described for sections A and B. The microfiches are now again stepped in the microfiche recorder 174 so that microfiche A is in the verifier portion thereof, microfiche B is in the digital recording or machine-readable section thereof, and a fresh piece of film from the film supply for receiving information C is in the human-readable section of the microfiche recorder 174. While the verifier section is checking the accession number and verifying the information on microfiche A, the machine-readable section is writing the information from section B of the disc file 166; and the human-readable section is writing the third microfiche from section C of the disc file 166. Simultaneous with the above actions, another microfiche D can be updated and edited by storing its information in a section D of the disc file 166. After this step is complete, microfiche A is ready to be filed in the storage unit 176, if the verifier section has accepted the validity of the recorded information. This stepwise progression continues as long as the system is in operation.

For simplicity and ease of description, a film processing section and a notching section of the microfiche cards are not shown in FIG. 12. However, such apparatus is generally known in the art of hologram recording and need not be described herein. While the film is being processed and the microfiche notched, additional sections to provide storage of the information within the disc file 166 are generally required. These sections are also known in the art and thus are not shown herein.

Figure 13:
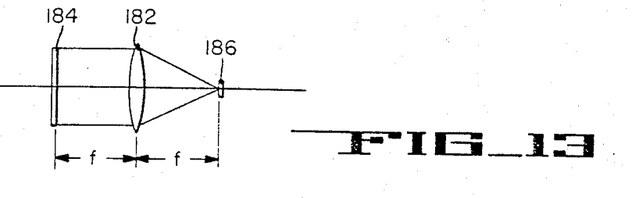
FIGS. 13, 14, 15, 16, and 17 are schematic diagrams showing desired and available prior art transforming lens systems, the procedure for improving the design of prior art systems and a 3-lens transforming system of the invention.

Regarding now FIGS. 13–17 there is shown the relationship between various desirable and available prior art transforming lens systems and finally a resulting three-lens transforming system in accordance with the invention. More particularly, FIG. 13 depicts a desired transforming lens system. To this end a transform lens 182 is disposed one focal length $f$ from an object 184 and produces the resulting transform 186 at the associated transform plane one focal length $f$ on the other side of lens 182. However, the minimum size of the aperture of lens 182 is at least equal to the modulator array size (see FIGS. 4, 6–9). It follows that in order to provide the required conditions of a lens aperture of at least 3 inches (to match the array size of the modulator 54, FIG. 4, etc.), and a transform maximum central zone size of the order of 1 millimeter, the lens 182 must have an $f$ number of 1.2 with a diameter of over 3 inches. Such a lens is not readily available, must be custom made and accordingly is prohibitively expensive.

Figure 14:
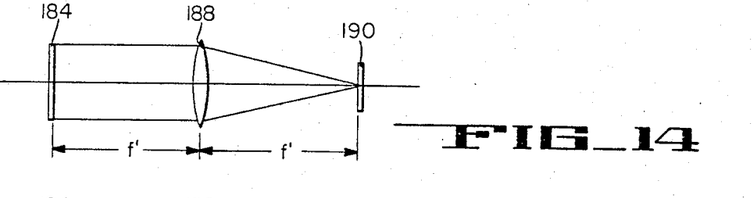

Referring to FIG. 14 there is illustrated a lens transforming system presently available in the prior art. A transform lens 188 is disposed one focal length $f'$ from the object 184 (of FIG. 13), and produces a transform 190 at an image plane spaced one focal length $f'$ therefrom. A commonly available lens 188 is employed, having the required large diameter (e.g., greater than 3 inches), which lens has an $f$-number of, for example, 5.6. However such a prior art system provides a transform 190 of relatively large size which prevents achieving the required packing density in recording the holograms. As may be seen, the transform size between FIGS. 13 and 14 is too large by a ratio equal to $f'/f$.

Figure 15:
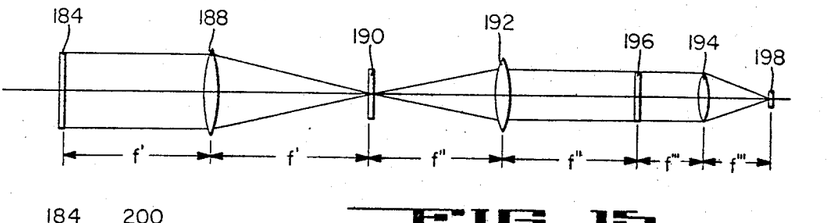

To provide a transform of practical size for the desired high packing densities, the lens configuration of FIG. 15 may be employed. To this end the assembly of FIG. 14 is modified by "telescoping" additional optics; i.e., by the addition, in series, of a pair of transforming lenses 192, 194. Lens 192 may be an $f$ 5.6 lens disposed one focal length $f''$ from the transform image 190 generated by the assembly of FIG. 14. A reduced image 196 of the array is focused at one focal length $f''$ from lens 192. The transforming lens 194, disposed one focal length $f'''$ from the reduced image 196, provides the final, desired size transform image 198 at a distance of one focal length $f'''$ therefrom. The (second) transform image 198 is smaller than the (first) transform image 190 by the ratio of $f'''/f'$. Therefore, $f/f' = f'''/f'$.

However, the total length of the system of FIG. 15 is now 2 $(f' + f'' + f''')$. Such length is obviously undesirable in a practical transforming apparatus for use in the recording systems of FIGS. 4, 6–9, of previous description.

Figure 16:
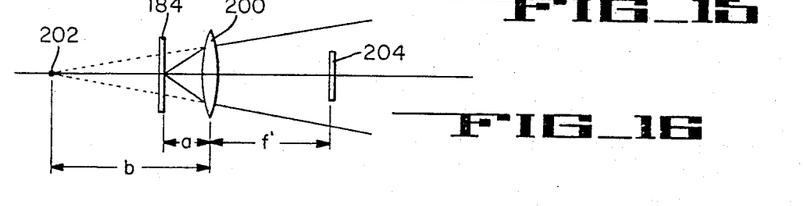

Referring to FIG. 16 a transform lens 200 of, for example, $f$ 5.6 is disposed from the object 184 at a distance less than the focal length $f'$, i.e., at a distance, a, less than $f'$. The virtual image 202 is formed at a distance, b, from lens 200, and a transform image 204 is formed a distance of one focal length $f'$ from lens 200. However, as in the system of FIG. 14 the transform image 204 is too large to be practical. Further the transform has undesirable spherical phase since the point source at the object plane 184 along image 204, does not collimate on the corresponding right hand side of the lens 200.

Figure 17:
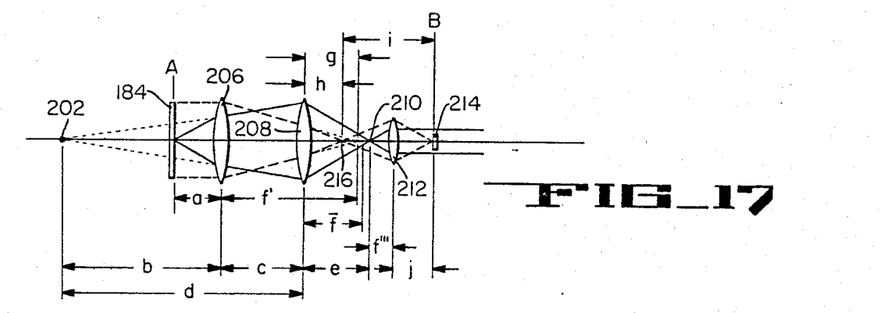

The various objections noted with respect to the systems of FIGS. 14–16 are circumvented, while the conditions of a small transform image from a relatively large modulator array via inexpensive, off-the-shelf lenses, are provided by the three-lens transforming system of FIG. 17. The latter is analogous to the three-lens transforming systems 74 and 130 employed, for example in FIGS. 6 and 8–9 respectively.

Accordingly, as in FIG. 16, a lens 206 is disposed a distance, a, less than $f'$ from the object 184, whereby a virtual image 202 of the object is formed at distance b from lens 206. Lens 206 may be for example $f$ 5.6 and thus readily available in a size greater than the 3 inch square modulator arrays of previous mention. A middle lens 208 is disposed a distance, c, from the lens 206 so as to provide a real image at a point 210 a distance, e, from the middle lens 208. The virtual object lies a distance d from the middle lens 208. The focal length $\bar{f}$ of lens 208 is shown in FIG. 17, and is less than the distance e, whereat the real image is formed at point 210. A third (transform) lens 212 (analogous to lens 194 of FIG. 15) is disposed a focal length $f'''$ from the real image point 210 and focuses the (second) transform 214 at a distance j therefrom. Note lens 212 may be an $f$ 1.2 lens of conventionally available diameter, which accordingly is an off-the-shelf item. Note further that the transform 214 of small size is generated with conventional lenses, disposed in a system of relatively short length when compared with the prior art system of FIG. 15.

As shown in solid versus dashed lines, collimated light entering from either end of the system of FIG. 17, focuses at respective points corresponding to the object plane A and the final transform image plane B. When these two (converse) conditions are met, the three-lens transforming system of the invention is provided.

The procedure for determining the various major parameters of the three-lens transforming system of the invention involve: selection of the bit array size, e.g., number and spacing of the individual bits, and thus of the modulator size; determination of the desired recording bit density and thus of the recorded transform size; and selection of the lenses, particularly lenses 206 and 212 of FIG. 17, with respect to availability, price, quality, etc. The selection of the above parameters determines in turn the length of the three-lens system, and accordingly, compromises in the associated parameters may be made to achieve a desired length, transform size, etc. Thus in FIG. 17, lens 206 is disposed a distance, a, from the object 184 less than the focal length of the lens. Then lens 208 is disposed such that the virtual image of a point source on the object 184 produced by the lens 206, serves as an object for lens 208; i.e., lens 208 forms an image of the object at the (entrance) focal plane of the lens 212. This spacing provides the first condition of previous mention; that collimated light is produced by lens 212 from a point source on the object lying on object plane A.

To continue the spacing determination, collimated light on the object side of lens 206 converges to a point at the focal length f' of the lens 206 (as shown in phantom line beyond lens 208). Thus lens 208 is disposed at a point such that it intercepts the converging light and converges it to a point 216 which is closer to lens 206 than the focal length f', as shown in FIG. 17 by the dashed lines. Lens 212 is then placed such that this point 216 is imaged to a point at the plane B (i.e., the second condition is met). As previously mentioned, upon determining the spacings of the lens 206, 208 and 212 and thus meeting the two conditions, the system of FIG. 17 constitutes a three-lens transforming system in accordance with the invention, wherein the light signals in planes A and B constitute a true Fourier transform pair.

We claim

1. A Fourier transform hologram apparatus for handling selected continuous information containing phase and amplitude signals, including coherent light source means, a light sensitive recording medium disposed in a given transform plane, optical beam forming means including beam splitter means disposed to receive the light beam from the coherent light source means and adapted to provide coherent reference and object light beams, said coherent reference and object beams being superimposed on a selected region of the recording medium to define a hologram recording containing the information phase and amplitude signals, comprising the combination of:

light modulator means including a plurality of distinct non-symmetrical light modulating elements defining a non-symmetrically repetitive array of bits disposed to receive the object light beam and to selectively modulate the respective portion of the beam cross section which impinges each non-symmetrical element;

energizing means operatively coupled to each non-symmetrical element to continuously and selectively control the light output from each element commensurate with the selected continuous information introduced thereto to define a selectively modulated object light beam cross section;

first lens means disposed to introduce the object light beam to the light modulator means and to receive the selectively modulated object light beam therefrom, said first lens means forming a Fourier transform of the modulated beam at said selected region of the recording medium; and second lens means disposed to receive the reference and object beam from the beam splitter means to direct the object beam into said first lens means, and to direct the reference beam to said selected region of the recording medium at a selected angle thereto.

2. The apparatus of claim 1 wherein said light modulator means is a reflective object type of light modulator formed of a plurality of distinct non-symmetrical light reflective elements disposed along a common plane, said plane and thus said elements being disposed at a slight angle with respect to the axis of the incoming object beam, to selectively reflect light directed to the elements in response to said energizing means and the continuous information to be recorded, wherein the reflected selectively modulated object beam is directed back towards the first lens means slightly off-axis.

3. The apparatus of claim 2 wherein, said first lens means includes a single converging lens disposed to intercept the object beam initiated by the optical beam forming means, direct the beam to the reflective light modulator means, accept the reflected selectively modulated object beam from the slightly angled light modulator means in slightly off-axis relation, and redirect the modulated object beam towards said recording medium; and said second lens means is disposed to receive the object beam from the beam splitter means and direct same into said converging lens along the axis thereof, and includes optical reflective means disposed slightly off-axis for receiving the reflected selectively modulated object beam from the converging lens and directing same to the recording medium.

4. The apparatus of claim 3 including transform lenses disposed to receive the modulated object beam from the optical reflective means, and which in combination with the converging lens define a three-lens transforming means, said transform lenses including a pair of converging lens selectively disposed along a common optical axis extending to said single converging lens to provide a Fourier transform display of relatively small size while employing said single converging lens of relatively large f-number and large diameter equal to the array width, relative to the small size of the transform display.

5. The apparatus of claim 3 wherein said optical beam forming means includes second converging lens disposed to receive the light beam from the light source means, and a double beam splitter having a first splitter surface disposed to receive the light beam from said second converging lens;

wherein the plane of said light modulator means is disposed at a slight angle with respect to the axis of the incoming object beam which passes through the first splitter surface;

said double beam splitter includes a second splitter surface disposed to receive the reflected selectively modulated object beam slightly off-axis and to re-direct the modulated object beam to the recording medium.

6. The apparatus of claim 1 wherein the non-symmetrical array of light modulating elements are randomly located within regularly arranged permissible areas.

7. The apparatus of claim 1 wherein the spacing of the non-symmetrical array of light modulating elements changes evenly in selected direction in accordance with a logarithmic relationship.

8. The apparatus of claim 1 wherein said light modulator means is a transmissive object type of light modulator formed of a plurality of distinct non-symmetrical light transmissive elements disposed along a common plane to selectively transmit light directed to the elements in response to said energizing means and the continuous information to be recorded, and in the form of the selectively modulated object light beam cross section.

9. The apparatus of claim 8 wherein;
said first lens means includes, a collimating lens disposed to intercept the object beam initiated by the optical beam forming means and to introduce the object beam to the non-symmetrical light transmissive elements of the light modulator, and a transform generating lens disposed to receive the selectively modulated object beam and direct same to said recording medium; and
said second lens means is disposed to receive the object beam from the beam splitter and to direct same into said collimating lens along the axis thereof.

10. The apparatus of claim 1 wherein the non-symmetrical array of light modulating elements defines a spiral configuration of selected non-symmetrical spacings between elements.

11. The apparatus of claim 10 wherein the selected non-symmetrical spacings are defined by a logarithmic function.

12. The apparatus of claim 1 wherein the non-symmetrical array of light modulating elements are randomly located across the array surface.

13. The apparatus of claim 1 wherein the spacing of the non-symmetrical array of light modulating elements changes evenly in selected direction in accordance with a quadratic relationship.

14. The apparatus of claim 1 wherein the non-symmetrical array of light modulating elements is defined by a non-symmetrical sub-array of blocks of elements of regular spacing within blocks, wherein the center-to-center spacing between the non-symmetrical blocks is a selected non-integer multiple of the element spacing.

15. The apparatus of claim 14 wherein the array is further divided into non-symmetrical segments which define said blocks of elements, wherein the center-to-center spacing between the segments is also a selected non-integer multiple of the element spacing.

16. The apparatus of claim 1 wherein said second lens means includes optical spatial-filter means selectively disposed in the object and reference beams to filter out the noise carrying portion of the light beam from the light source means.

* * * * *